March 20, 1962     R. E. MOULE ETAL     3,025,939
CENTRIFUGAL CLUTCH
Filed April 7, 1959
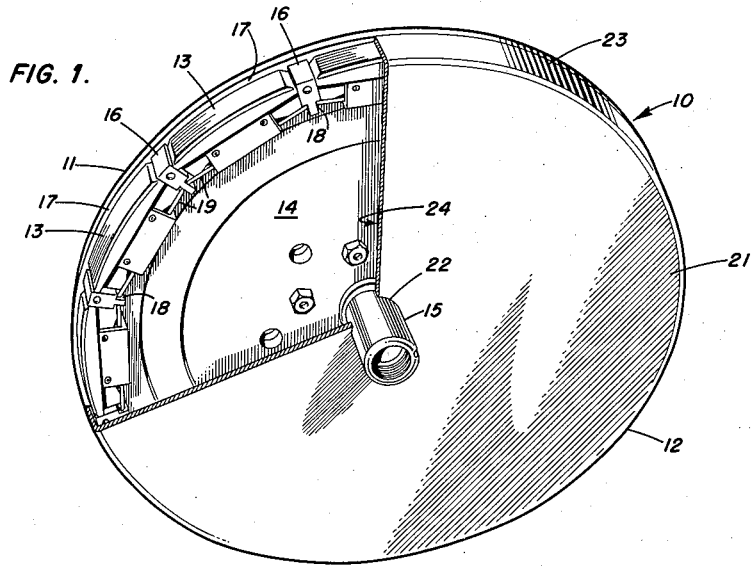
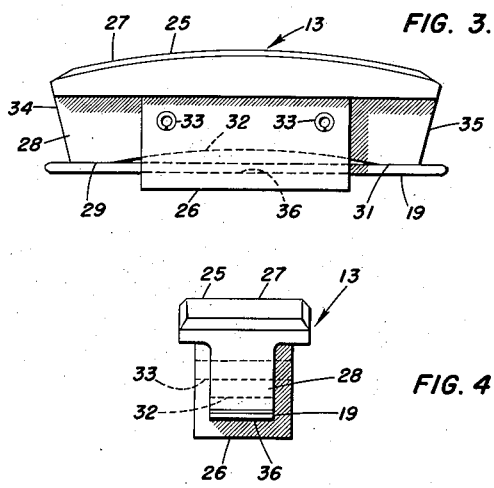
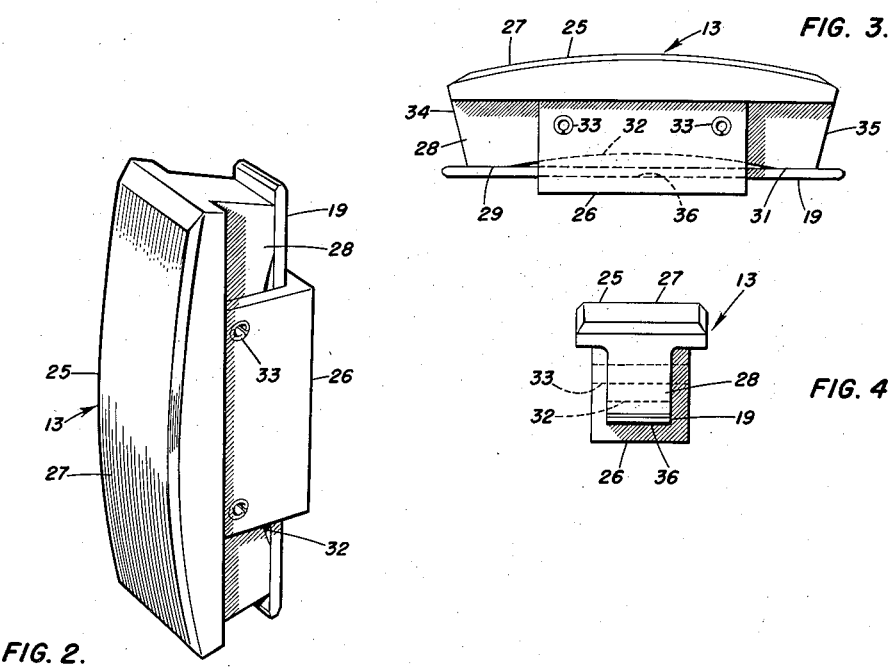
REX E. MOULE
LYNDOE E. FAIRBANKS
INVENTORS
BY
*Norman S. Blodgett*
ATTORNEY United States Patent Office 3,025,939
Patented Mar. 20, 1962

3,025,939
CENTRIFUGAL CLUTCH
Rex E. Moule, Holden, and Lyndoe E. Fairbanks, Worcester, Mass., assignors, by mesne assignments, to Formsprag Company, Warren, Mich., a corporation of Michigan
Filed Apr. 7, 1959, Ser. No. 804,720
4 Claims. (Cl. 192—105)

This invention relates to a centrifugal clutch and more particularly to a clutch operated by centrifugal action to join a driving motor to its load after the motor has come up to speed.

In the driving of many forms of apparatus a situation which is commonly encountered is that the machinery to be driven involves a considerable amount of inertia which, once rotation has begun, is capable of being driven by a motor of relatively low horsepower. Without other means, however, a motor of large horsepower must be connected to it to start it. One way of overcoming this difficulty is by inserting a centrifugal clutch between the motor and the machine, the centrifugal clutch having the faculty of transmitting the load between the motor and the machine only if the motor has arrived at a high speed, in which situation the torque available from the motor is quite high and is capable of starting the machine. Most centrifugal clutches are provided with shoes which are thrown outwardly by centrifugal force to transmit the driving force by friction from the motor to the load. Often these centrifugal clutches are provided with so-called "delayed action" shoes in which springs are provided to maintain the shoes out of the power-transmitting position until such time as the speed of the motor is sufficiently high. When this predetermined speed is reached, the spring tension which normally maintains the shoes out of contact is overcome by the centrifugal force and the shoe then moves to power-transmitting position. One design of these delayed action shoes uses a pair of pins located at the ends of the shoes which pins retain a leaf spring; however, a slight wearing of these pins or a slight bending brings about a loosening of the spring which permits the shoe to come into contact with the friction surface of the output side of the clutch long before the predetermined time is reached. Another known design of shoe is sometimes used in which the central portion of the leaf spring is bolted to a centrally-located abutment of the shoe. In this situation, however, the shoe cannot move peripherally along the clutch and the load is sometimes transmitted between the input side of the clutch and the shoe through the spring only which not only is not a proper load carrying member but may position the shoe angularly in its clutch pocket in such a manner that proper friction contact is not made between the outer periphery of the shoe and the output side of the clutch. These and other difficulties experienced with the prior art devices have been obviated in a novel manner by the present invention.

It is, therefore, an outstanding object of the invention to provide a centrifugal clutch having a delayed action shoe in which the force is transmitted through the main body of the shoe rather than through a leaf spring.

Another object of this invention is the provision of a centrifugal clutch whose friction shoe makes use of a novel manner of attaching a delayed action spring.

A further object of the present invention is the provision of a shoe for a centrifugal clutch in which the main body of the shoe is capable of sliding relative to a delayed action leaf spring.

It is another object of the instant invention to provide a centrifugal clutch having shoes provided with leaf springs in which the manner of attaching the leaf spring is such that a broad surface of contact with the spring is provided, the said surface being capable of very little wear so that the amount of looseness of the spring relative to the main shoe body remains relatively constant over a long period of operation.

It is a further object of the invention to provide a simple design of delayed action shoe which is rugged and dependable in construction, which is relatively easy to manufacture and service, and which is capable of a long life of useful service.

With these and other objects in view, as will be apparent to those skilled in the art, the invention resides in the combination of parts set forth in the specification and covered by the claims appended hereto.

The character of the invention, however, may be best understood by reference to certain of its structural forms, as illustrated by the accompanying drawings in which:

FIG. 1 is a perspective view of a centrifugal clutch embodying the principles of the present invention with a portion broken away to show the internal structure.

FIG. 2 is a perspective view of a shoe used in the clutch.

FIG. 3 is a side elevational view of the shoe, and

FIG. 4 is an end elevational view of the shoe.

Like reference characters denote similar parts in the several figures of the drawings.

Referring first to FIG. 1, wherein are best shown the general features of the invention, the centrifugal clutch, indicated generally by the reference numeral 10, is shown as consisting of a driving member 11 and a driven member 12 having friction shoes 13 interposed therebetween. The driving member 11 consists of a generally disk-like main portion 14 having a keyed hollow shaft 15 extending axially therefrom. A series of equally spaced dividing walls 16 are bolted to the main body 14 adjacent its outer periphery. The sides of these dividing walls are arranged to lie along radial planes which intersect the axis of the shaft 15 and the walls define between them wedge-shaped pockets 17. In each of these pockets is located a friction shoe 13. Each of the dividing walls 16 is provided at its inner portion with notches or recesses 18 so that the inner portion is somewhat reduced. Each friction shoe is provided with an elongated leaf spring 19 each end of which extends into a recess 18 of an adjacent dividing wall 16. The driven member 12 also is provided with a disk-like main body 21 having a central aperture 22 through which extends the shaft 15. At its outer periphery the main body 21 is provided with an axial rim or flange 23 which extends toward the main body 14 of the driving member 11 and contacts it adjacent its outer periphery to form a generally cylindrically-shaped chamber 24 within which are located the dividing walls 18 and the friction shoes 13. The inner surface of the flange 23 is smoothly finished to provide a cylindrical surface which is engageable by the friction shoes on occasion. The dividing walls 18 extend axially a sufficient distance to approach and contact the inner side of the main body 21 of the driven member 12. It will be understood that the shaft 15 is adapted to be attached to a motor (not shown) while the driven member 12 is adapted to be attached to the load in a manner which is also not shown but which is well known in the art.

Referring now to FIGS. 2, 3, and 4, which best show the construction of the friction shoe 13, it can be seen that each shoe consists of a main body 25, a saddle 26, and the leaf spring 19 which has been discussed heretofore. The main body is elongated and is generally T-shaped in cross section, as is best evident in FIG. 4. The head of the T is provided with a cylindrical surface 27 which has the same curvature and which is adapted to contact the inner cylindrical surface of the flange 23 of the driven member 12. The leg of the T extends radially inwardly and is indicated as the mounting flange 28. The main body 25 is formed of a suitable alloy, preferably having a high copper content, which will provide suitable frictional characteristics when used with a driven member 12 formed of cast iron or the like. Incidentally, the head of the T, having the cylindrical surface 27, is suitably relieved by bevels and the like in the usual manner. The inner extremity of the mounting flange 28 is provided at its ends with two flat surfaces 29 and 31, these surfaces lying in the same plane which is generally perpendicular to a radial line joining the center of the cylindrical surface 27 to its center of curvature. In between these two flat surfacecs the inner portion of the mounting flange 28 is provided with an arcuate relief 32 having a substantially smaller radius of curvature than the cylindrical surface 27, but otherwise being generally concentric therewith. Embracing the center of the mounting flange 28 is the saddle 26 which has a generally U-shaped cross-section. The legs of the U extend upwardly around the mounting plate and engage the under surface of the head of the T. Suitable bores extend through both the saddle and the mounting flange 28 and the two are held together by split pins 33. The inner portion of the saddle 26 is provided with a perfectly flat surface 36 which is spaced from and parallel to the flat surfaces 29 and 31 on the mounting flange, the spacing being exactly equal to the thickness of the leaf spring 19. The leaf spring resides within the saddle with its lower surface contacting the surface 36 and its upper surface contacting the flat surfaces 29 and 31. The spring is long enough so that its ends extend beyond the ends of the mounting flange 28. Incidentally, as is particularly evident in FIG. 3, the ends of the main body 25 are provided with flat surfaces 34 and 35 which extend along radial planes extending from the cylindrical surface 27 to its center of curvature. These surfaces 34 and 35 are at all times closely adjacent to the sides of the dividing walls 16 and, of course, have the same inclination toward the axis of the shaft 15.

The operation of the present invention will now be readily understood in view of the above description. When the friction shoes 13 are assembled in the pockets 17 of the clutch, the springs 19 are in a generally straight unstressed condition extending from one recess 18 of a wall 16 to another recess of a similar wall. The dimensions are selected so that in this position the cylindrical surface 27 does not contact the inner surface of the flange 23 of the driven member 12. When the motor is started up and drives the shaft 15 and, therefore, the driving member 11, there is nothing in the way of a substantial connection between the driving member 11 and the driven member 12 to cause a transmittal of power to the load which is attached to the driven member 12. Now, as the motor speed increases, centrifugal force acting on the main bodies 25 of the friction shoes brings about a radial force which tends to bend the spring 19 away from the flat surfaces 29 and 31. The ends of the springs must necessarily remain behind in the recesses 18 and the shoe moves radially outwardly carrying with it the saddle 26 and the center portion of the spring 19. The spring size is suitably selected so that at a predetermined speed the shoe 13 has moved outwardly a predetermined distance and the cylindrical surface 27 engages the inner cylindrical surface of the flange 23 so that power is transmitted by friction to the load. Now, when the motor is first started up, the main body 25 and the saddle 26 are capable of sliding relative to the spring 19 which, generally speaking, is held against peripheral movement by engagement with the ends of the recesses 18. Therefore, the shoe slides rearwardly because of inertia until it engages a wall 16. It can be seen, then, that when the shoe ultimately makes engagement with the driven member 12 force is transmitted from the motor to the shaft 15 through the main body 14 of the driving member 11, through the solidly constructed dividing wall 16 directly into the shoe by means of either the surface 35 or the surface 34. The transmittal of power is through structures which are adequate to transmit that power. At the same time, the transmittal of power to the shoe in this way causes no angular movement of the shoe within its pocket which might cause it to make localized contact only with the inner surface of the driven member 12. If any wearing takes place, due to the sliding of the shoe relative to the spring 19, it will be the surface 36, which, being quite broad, is capable of considerable movement and abrasion before enough material is removed to make the distance between the surface 36 and the flat surfaces 29 and 31 sufficient to make the spring too loose. This is contrary to the experience with prior art devices where a small amount of wear has caused sufficient looseness to render the construction inoperative. As a practical matter, too, it will be understood that when it is desired to use a thicker spring 19, it is only necessary to remove a suitable amount of material from the mounting flange 28 in the area of the flat surfaces 29 and 31. This permits standardization of construction which results ultimately in better service and a less expensive clutch.

It is obvious that minor changes may be made in the form and construction of invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A centrifugal clutch comprising a rotatable driving member, a driven member mounted in outwardly concentric relation to said driving member, said driven member having an inwardly facing cylindrical surface axially overlapping said driving member, said driving member having fixed, generally radial walls defining circumferentially spaced pockets adjacent and radially inwardly of said cylindrical surface, said walls having recesses on circumferentially spaced sides thereof facing said pockets, and shoes positioned in said pockets, each shoe comprising a body formed with an arcuate, radially outwardly facing surface adjacent and adapted to engage said cylindrical driven member surface upon radially outward movement of the shoe, a saddle U-shaped radial cross section substantially throughout a circumferentially extending dimension thereof, said saddle embracing the sides of said body in a circumferentially central portion of the latter and having ends of the saddle spaced circumferentially inwardly of the ends of said body, and an elongated leaf spring positioned between said saddle and said body, with free ends of said spring extending past the ends of said saddle and said body, each of said springs having said free ends engaged in recesses in walls on either side of a pocket in which the shoe is disposed, one side of said spring facing radially inwardly and having an intermediate portion in flatwise engagement with said saddle over a portion of the latter of substantial rectangular area intermediate the ends thereof, the opposite side of said spring having end portions outwardly of the saddle engaged with radially inward facing surfaces of said body outwardly of said saddle which are of substantial area, said body being radially outwardly relieved between said last named surfaces to accommodate flexure of said intermediate portion of said spring relative to said intermediate portion of the saddle upon said outward movement of the shoe.

2. A centrifugal clutch comprising a rotatable driving member, a driven member mounted in outwardly concentric relation to said driving member, said driven member having an inwardly facing cylindrical surface axially overlapping said driving member, said driving member having fixed, generally radial walls defining circumferentially spaced pockets adjacent and radially inwardly of said cylindrical surface, said walls having recesses on circumferentially spaced sides thereof facing said pockets, and shoes positioned in said pockets, each shoe comprising a body formed with an arcuate, radially outwardly facing surface adjacent and adapted to engage said cylindrical driven member surface upon radially outward movement of the shoe, said body having a radially inwardly extending flange between axially facing sides thereof, a saddle of U-shaped radial cross section substantially throughout a circumferentially extending dimension thereof, said saddle embracing said flange sides in a circumferentially central portion of said flange and having ends of the saddle spaced circumferentially inwardly of the ends of said flange, and an elongated leaf spring positioned between said saddle and said flange, with free ends of said spring extending past the ends of said saddle and said flange ends, each of said springs having said free ends engaged in recesses in walls on either side of a pocket in which the shoe is disposed, one side of said spring facing radially inwardly and having an intermediate portion in flatwise engagement with said saddle over a portion of the latter of substantial rectangular area intermediate the ends thereof, the opposite side of said spring having end portions outwardly of the saddle engaged with radially inwardly facing surfaces of said flange outwardly of said saddle which are of substantial area, said flange being radially outwardly relieved between said last named surfaces to accommodate flexure of said intermediate portion of said spring relative to said intermediate portion of the saddle upon said outward movement of the shoe.

3. A shoe for a centrifugal clutch comprising a body formed with an arcuate, radially outwardly facing surface, a saddle of U-shaped radial cross section substantially throughout a circumferentially extending dimension thereof, said saddle embracing the sides of said body in a circumferentially central portion of the latter and having ends of the saddle spaced circumferentially inwardly of the ends of said body, and an elongated leaf spring positioned between said saddle and said body, with free ends of said spring extending past the ends of said saddle and said body, one side of said spring facing radially inwardly and having an intermediate portion in flatwise engagement with said saddle over a portion of the latter of substantial rectangular area intermediate the ends thereof, the opposite side of said spring having end portions outwardly of the saddle engaged with radially inwardly facing surfaces of said body outwardly of said saddle which are of substantial area, said body being radially outwardly relieved between said last named surfaces to accommodate flexure of said intermediate portion of said spring relative to said intermediate portion of the saddle.

4. A shoe for a centrifugal clutch comprising a body formed with an arcuate, radially outwardly facing surface, said body having a radially inwardly extending flange between axially facing sides thereof, a saddle of U-shaped radial cross section substantially throughout a circumferentially extending dimension thereof, said saddle embracing said flange sides in a circumferentially central portion of said flange and having ends of the saddle spaced circumferentially inwardly of the ends of said flange, and an elongated leaf spring positioned between said saddle and said flange, with free ends of said spring extending past the ends of said saddle and said flange ends, said spring facing radially inwardly and having an intermediate portion in flatwise engagement with said saddle over a portion of the latter of substantial rectangular area intermediate the ends thereof, the opposite side of said spring having end portions outwardly of the saddle engaged with radially inwardly facing surfaces of said flange outwardly of said saddle which are of substantial area, said flange being radially and outwardly relieved between said last named surfaces to accommodate flexure of said intermediate portion of said spring relative to said intermediate portion of the saddle.

References Cited in the file of this patent

UNITED STATES PATENTS

| 1,727,467 | Johnson | Sept. 10, 1929 |
| 2,529,610 | Jensen et al. | Nov. 14, 1950 |
| 2,747,713 | Light | May 29, 1956 |

FOREIGN PATENTS

| 171,198 | Great Britain | Nov. 17, 1921 |